US008667597B2

(12) United States Patent
Safford, III

(10) Patent No.: US 8,667,597 B2
(45) Date of Patent: Mar. 4, 2014

(54) SYSTEMS, METHODS, AND PRODUCTS FOR SECURE CODE EXECUTION

(75) Inventor: Edward L. Safford, III, Bedford, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 857 days.

(21) Appl. No.: 12/404,898

(22) Filed: Mar. 16, 2009

(65) Prior Publication Data
US 2009/0328232 A1   Dec. 31, 2009

Related U.S. Application Data
(60) Provisional application No. 61/075,522, filed on Jun. 25, 2008.

(51) Int. Cl.
   *G06F 7/00*   (2006.01)
   *G06F 11/30*   (2006.01)
   *G06F 9/30*   (2006.01)

(52) U.S. Cl.
   USPC ............................ 726/26; 713/194; 712/204

(58) Field of Classification Search
   USPC ............................... 713/190, 194, 189; 726/6
   See application file for complete search history.

(56) References Cited

U.S. PATENT DOCUMENTS

| | | | | |
|---|---|---|---|---|
| 4,935,867 A | * | 6/1990 | Wang et al. | 711/217 |
| 5,142,631 A | * | 8/1992 | Murray et al. | 712/217 |
| 5,940,513 A | | 8/1999 | Aucsmith et al. | |
| 6,079,015 A | * | 6/2000 | Harwood et al. | 712/244 |
| 6,487,640 B1 | * | 11/2002 | Lipasti | 711/140 |
| 6,567,917 B1 | | 5/2003 | Ziese | |
| 6,754,809 B1 | * | 6/2004 | Guttag et al. | 712/225 |
| 6,802,006 B1 | | 10/2004 | Bodrov | |
| 6,871,192 B2 | | 3/2005 | Fontana et al. | |
| 7,383,443 B2 | * | 6/2008 | Zeman et al. | 713/190 |
| 7,475,254 B2 | | 1/2009 | Craft | |
| 2003/0120938 A1 | | 6/2003 | Mullor | |
| 2007/0039048 A1 | * | 2/2007 | Shelest et al. | 726/22 |

OTHER PUBLICATIONS

Marian, Winter, "Using M68HC12 Indexed Indirect Addressing" Oct. 2005, pp. 1-16, http://web.archive.org/web/20050715000000*/ http://www.freescale.com/files/microcontrollers/doc/app_note/ AN1716.pdf   http://web.archive.org/web/20051022194321/http:// www.freescale.com/files/m icrocontrollers/doc/app_note/AN1716. pdf.*

(Continued)

*Primary Examiner* — Kaveh Abrishamkar
*Assistant Examiner* — Carlos M De Jesus, Jr.
(74) *Attorney, Agent, or Firm* — Bracewell & Giuliani LLP

(57) ABSTRACT

Methods, program product, and systems for providing tamper-resistant executable software code are provided to enable software code transport, storage, and execution security by formatting all instructions to use operand indirect addressing, resulting in an indirect table for each operand position, or field, in the instruction set. That is, rather than each instruction including an operand, each instruction includes an index to the location of the value of the operand in an indirect table. The methods, program product, and systems can also implement a non-typical instruction fetch associated with a program counter and a sequentially stored vector table, or jump table, to retrieve the next sequential instruction ("NSI"). Following rearranging or scrambling or encoding of the executable code, the code can be loaded and executed directly in scrambled form using the jump table, but cannot be meaningfully disassembled, nor executed properly, without the jump table to resolve the NSI.

20 Claims, 14 Drawing Sheets

(56) References Cited

OTHER PUBLICATIONS

Aeroflex, "Indirect branch Destination Register Corruption on the UT80CXX196KD" Sep. 2009, pp. 1-5, http://www.aeroflex.com/ams/pagesproduct/erratas/80196branch.pdf.*

Agarwal, "Instruction Fetch Execute Cycle", Dec. 2004, pp. 1-10, http://realboyemulator.files.wordpress.com/2013/01/ife.pdf.*

"Instructions and Addressing Modes" pp. 1-9 http://web.archive.org/web/20060616092241/http://www.electronics.dit.ie/staff/ypanarin/Lecture%20Notes/K235-1/02%20Addressing%20Modes20%206800.pdf.*

Marian, Winter, "Using M68HC12 Indexed Indirect Addressing" Oct. 2005, pp. 1-16, http ://web. arch ive.o rg/web/20050715000000*/http://www.freescale.com/files/microcontrollers/doc/app_note/AN 1716.pdf http ://web. arch ive.o rg/web/20051022194321/http ://www.freescal e.co m/fi les/m icroco ntrolle rs/doc/app_note/AN 1716. pdf.*

Aeroflex, "Indirect branch Destination Register Corruption on the UT80CXX196KD" Sep. 2009, pp. 1-5, http://www.aeroflex.com/ams/pagesproduct/erratas/80196branch.pall.*

Agarwal, "Instruction Fetch Execute Cycle", Dec. 2004, pp. 1-10, http://realboyemulator.files.wordpress.com/2013/O1/ife.pdf.*

Christopher George, "A Framework for Install-time Optimization of Binary Dynamic-Link Libraries" 1999, pp. 1-105 http://impact2.crhc.illinois.edu/ftp/report/ms-thesis-ch ristopher-george.pdf http://impact.crhc.illinois.edu/paper.aspx?paper_id=77&session id=170.*

McGee, "On Dynamic Program Relocation", IBM System Journal, vol. 4, 1965, pp. 184-199 http://ieeexplore.ieee.org/stamp/stamp.jsp?tp=&arnumber=5388458.*

"Instructions and Addressing Modes" pp. 1-9 http://web.archive.org/web/20060616092241/http://www.electronics.dit.ie/staff/ypanarin/Lecture%20Notes/K235-1/02%20Addressing%20Modes%206800.pdf.*

"Instructions and Addressing Modes" pp. 1-9 http://wayback.archive.org/web/20060501000000*/http://www.electronics.dit.ie/staff/ypanarin/Lecture%20Notes/K235-1/02%20Addressing%20Modes%206800.pdf.*

* cited by examiner

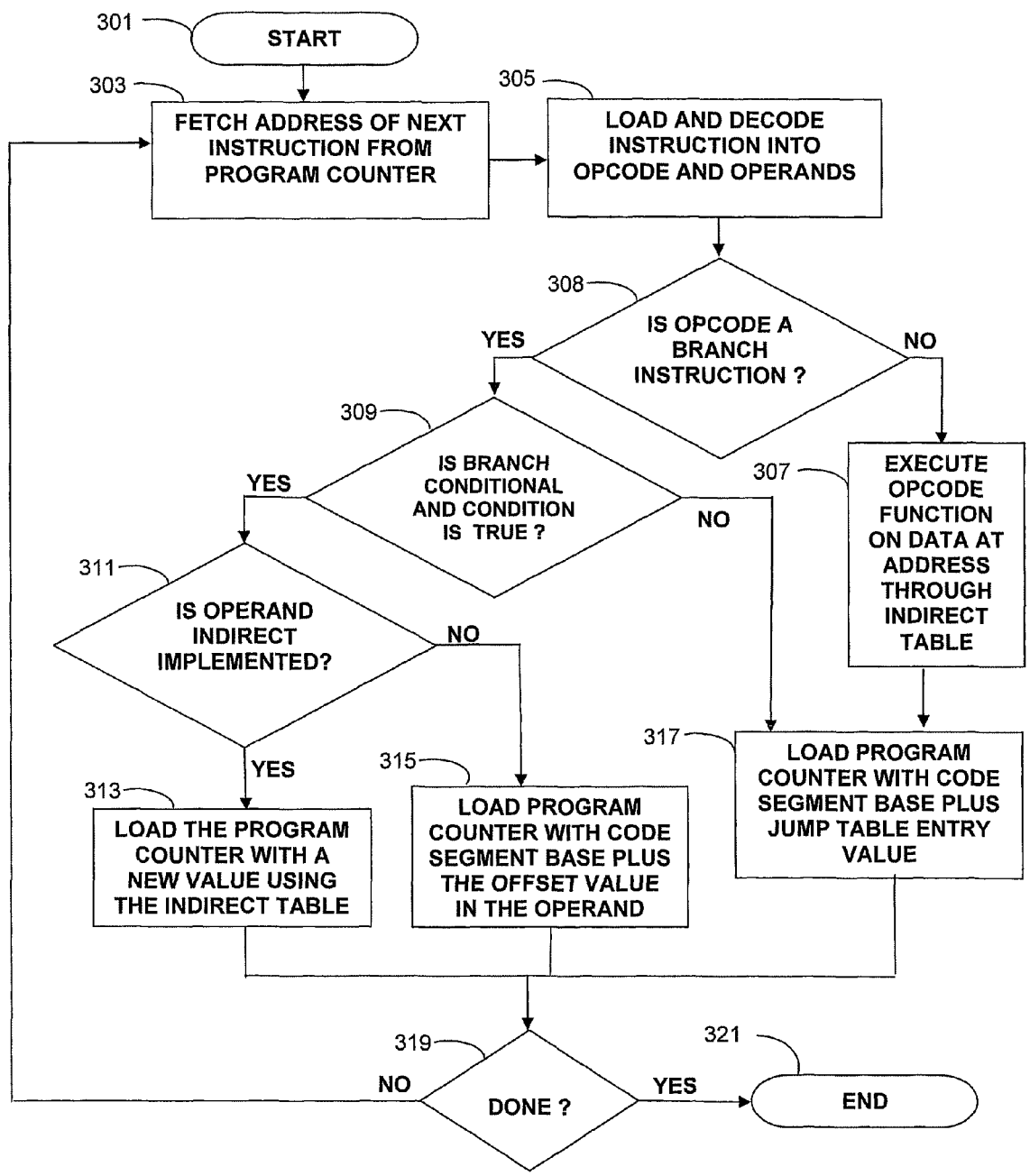

FIGURE 4A

| 401 | 403 | 405 | 407 |
|---|---|---|---|
| 1 | L | A | 2 |
| 2 | A | B | 3 |
| 3 | T | C | 4 |
| 4 | JN | 6 | 5 |
| 5 | J | 8 | 8 |
| 6 | H | | |
| 7 | J | 2 | 2 |
| 8 | S | D | 9 |
| 9 | J | 3 | 3 |

FIGURE 4B

| 411 | 413 | 415 | 417 |
|---|---|---|---|
| 2 | A | B | 3 |
| 1 | L | A | 2 |
| 4 | JN | 6 | 5 |
| 3 | T | C | 4 |
| 6 | H | | |
| 5 | J | 8 | 8 |
| 8 | S | D | 9 |
| 7 | J | 2 | 2 |
| | | | |
| 9 | J | 3 | 3 |

FIGURE 4C

| 421 | 423 | 425 | 427 | 429 |
|---|---|---|---|---|
| 2 | A | B (B) | 3 | 4 |
| 1 | L | A (A) | 2 | 1 |
| 4 | JN | 6 (5) | 5 | 6 |
| 3 | T | C (C) | 4 | 3 |
| 6 | H | | | 5 |
| 5 | J | 8 (7) | 8 | 7 |
| 8 | S | D (D) | 9 | 10 |
| 7 | J | 2 (1) | 2 | 1 |
| | | | | |
| 9 | J | 3 (4) | 3 | 4 |

| 431 | 433 | 435 | 437 | 439 |
|---|---|---|---|---|
| 1 | A | i1 | (B) | 4 |
| 2 | L | i2 | (A) | 1 |
| 3 | JN | i3 | (5) | 6 |
| 4 | T | i4 | (C) | 3 |
| 5 | H | i5 |  | 5 |
| 6 | J | i6 | (7) | 7 |
| 7 | S | i7 | (D) | 10 |
| 8 | J | i8 | (1) | 1 |
| 9 |  |  |  |  |
| 10 | J | i10 | (4) | 4 |

| 441 | 443 |
|---|---|
| A | i1 |
| L | i2 |
| JN | i3 |
| T | i4 |
| H | i5 |
| J | i6 |
| S | i7 |
| J | i8 |
|  |  |
| J | i10 |

| 451 |
|---|
| (B) |
| (A) |
| (5) |
| (C) |
|  |
| (7) |
| (D) |
| (1) |
|  |
| (4) |

| 461 |
|---|
| 4 |
| 1 |
| 6 |
| 3 |
| 5 |
| 7 |
| 10 |
| 1 |
|  |
| 4 |

| 501 | 503 |
|---|---|
| A | i1 |
| L | i2 |
| J (509) | 20 |
| T | i4 |
| H | i5 |
| J | i6 |
| S | i7 |
| J | i8 |
|  |  |
| J | i10 |

| 505 |
|---|
| (B) |
| (A) |
| (5) |
| (C) |
|  |
| (7) |
| (D) |
| (1) |
|  |
| (4) |

| 507 |
|---|
| 4 |
| 1 |
| 6 |
| 3 |
| 5 |
| 7 |
| 10 |
| 1 |
|  |
| 4 |

| 551 | 553 |
|---|---|
| A | i1 |
| L | i2 |
| L (561) | i6 |
| S (563) | i7 |
| T (565) | i9 |
| Data (567) |  |
| Data (569) |  |
| J | i8 |
|  |  |
| J | i10 |

| 555 |
|---|
| (B) |
| (A) |
| (5) |
| (C) |
|  |
|  |
| (7) |
| (D) |
| (1) |
|  |
| (4) |

| 557 |
|---|
| 4 |
| 1 |
| 6 |
| 3 |
| 5 |
| 7 |
| 10 |
| 1 |
|  |
| 4 |

CODE EXECUTION
ON CHIP ABSTRACTION

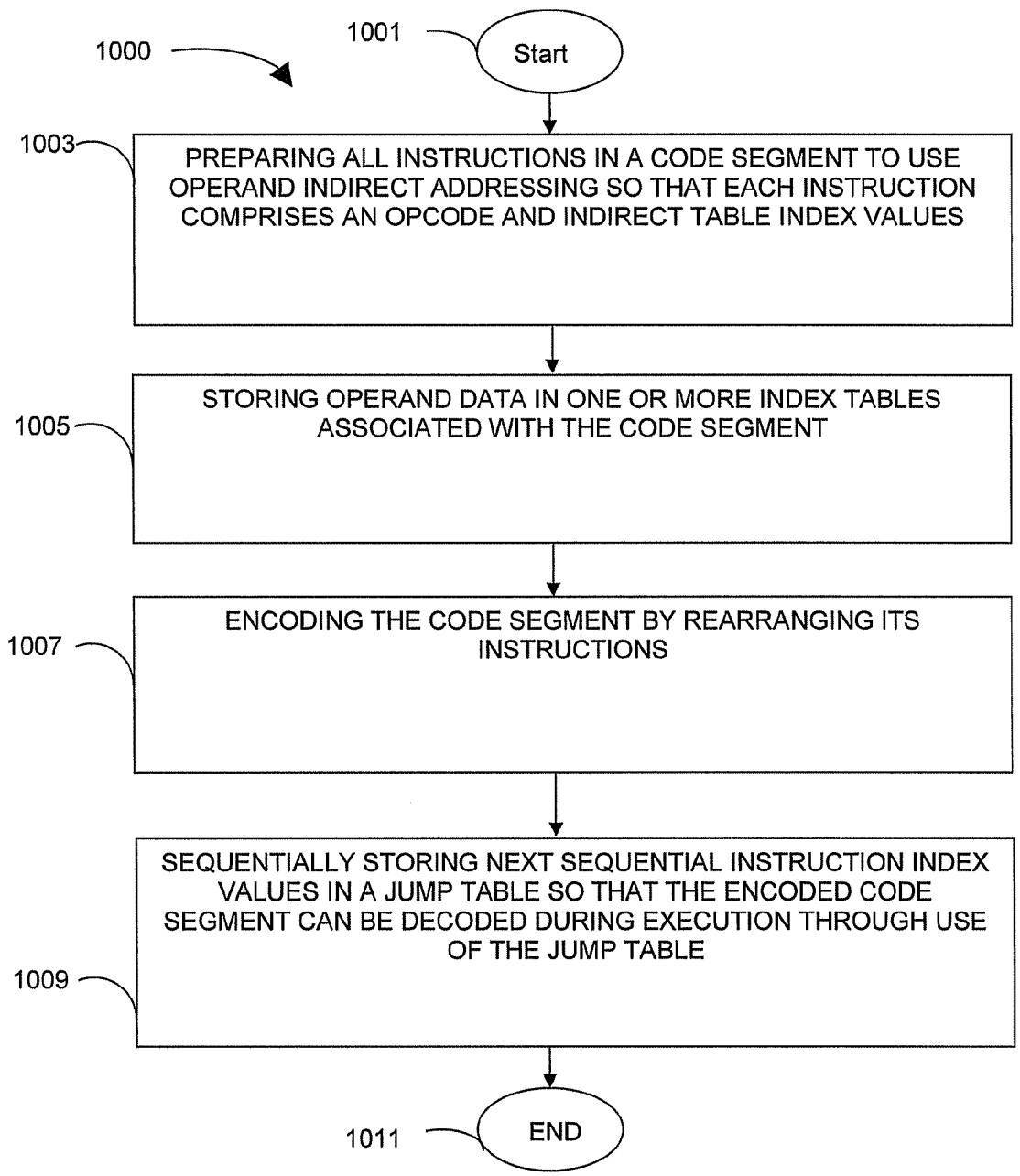

SYSTEMS, METHODS, AND PRODUCTS FOR SECURE CODE EXECUTION

RELATED APPLICATIONS

This application claims priority to and the benefit of U.S. Provisional Patent Application Ser. No. 61/075,522, by Safford, titled "Systems, Methods, and Program Products for Secure Code Execution", filed Jun. 25, 2008, incorporated herein by reference in its entirety.

BACKGROUND

1. Field of Invention

Embodiments of the present invention relate in general to computer security and, more particularly, to systems, methods, and program products for providing tamper-resistant executable software code.

2. Background

It is known that software that is compiled into executable code and in an executable image is subject to various types of tampering, including through the insertion of an unauthorized patch code and through snooping of the code to find vulnerabilities. Encryption and decryption, checksums, and other assurance methods are known to protect the distribution of software code, but not necessarily execution of the code. Further, if used during execution encryption and decryption, in particular, can often result in a significant and unacceptable performance reduction under modern software architectures.

SUMMARY OF INVENTION

In view of the foregoing, embodiments of the present invention provide systems, computer-implemented methods, and program products to increase security and protect software code that has been compiled and is in executable image from various types of tampering, such as, for example, the insertion of unauthorized patch code and snooping of the code to find vulnerabilities.

Embodiments of the present invention enable software code execution security by preparing each executable "line" of code, i.e., an individual instruction or sequence, for a set of instructions contained in a protected portion of an executable program to use "operand indirect," a standard form of indirect operand addressing, resulting in an indirect table for each operand position, or field, in the instruction set. That is, rather than each instruction including an operand value or address, each instruction includes an index to the location of the value of the operand in an indirect table. Instruction sets with multiple operand fields result in multiple indirect tables, one table per operand field. Operand indirect can particularly enable software code execution security against snooping of the code to find vulnerabilities thereof, or other similar forms of tampering, due to its application of operand indexing. Any analysis of the code without the indirect table is rendered practically meaningless. That is, rather than providing the operands, indexes, or pointers or references, to a table of operands are instead provided or otherwise available to the executable code segment.

Embodiments of the present invention further enable software code execution security by implementing a non-typical instruction fetch, associated with a program counter, and a sequentially stored vector table, or jump table, to retrieve the next sequential instruction ("NSI"). Embodiments of the present invention further scramble, or rearrange or encode, the executable code using various methods and techniques, so that the executable code can be loaded and executed directly in scrambled form using the jump table, but cannot be disassembled, nor executed properly, without the jump table to resolve the NSI. The jump table and instruction fetch can particularly enable software code execution security with respect to unauthorized patch code or other similar forms of tampering. An overwritten portion of code, for example, will execute in the order according to the jump table, and not in sequential or any other order as anticipated by the installer of the patch code.

The indirect table and jump table embodiments of the present invention can be implemented independently or, preferably, together. Moreover, the indirect tables and jump table can be separately loaded and moved around in memory, as understood by those skilled in the art, to further increase security and protect the software code. Other assurance measures are also provided within the embodiments of the present invention, such as checksums or digital signature, to maintain distribution and execution integrity.

BRIEF DESCRIPTION OF DRAWINGS

So that the manner in which the features and benefits of the invention, as well as others which will become apparent, may be understood in more detail, a more particular description of the invention briefly summarized above may be had by reference to the embodiments thereof which are illustrated in the appended drawings, which form a part of this specification. It is also to be noted, however, that the drawings illustrate only various embodiments of the invention and are therefore not to be considered limiting of the invention's scope as it may include other effective embodiments as well.

FIG. 3 is a logic diagram of secure code execution according to an embodiment of the present invention;

FIGS. 4A-4G are a series of tables illustrating an example of an encoding scheme for providing tamper-resistant executable software using a single operand instruction set according to an embodiment of the present invention;

FIG. 4H is a schematic diagram of an encoded executable image according to one embodiment of the present invention;

FIG. 10 is a block flow diagram of a method of providing tamper-resistant executable software code according to an embodiment of the present invention;

DETAILED DESCRIPTION OF INVENTION

The present invention will now be described more fully hereinafter with reference to the accompanying drawings in which embodiments of the invention are shown. This invention may, however, be embodied in many different forms and should not be construed as limited to the illustrated embodiments set forth herein; rather, these embodiments are provided so that this disclosure will be thorough and complete, and will fully convey the scope of the invention to those skilled in the art. Like numbers refer to like elements throughout.

Figure 1A:
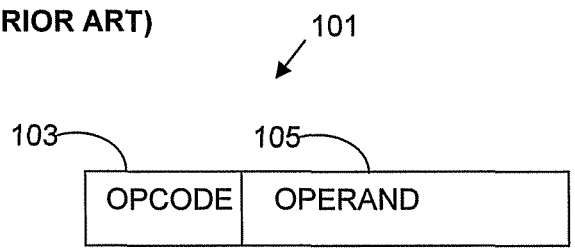
FIG. 1A is a schematic diagram of a computer or microprocessor instruction according to prior art.

In modern computer and microcontroller architectures, an individual instruction includes an opcode specifying the operation to be performed, such as "add contents of memory to register", and zero or more operand fields, which may specify registers, memory locations, or literal data. For example, FIG. 1A illustrates an individual instruction 101 having an opcode 103 and one operand 105.

Figure 1B:
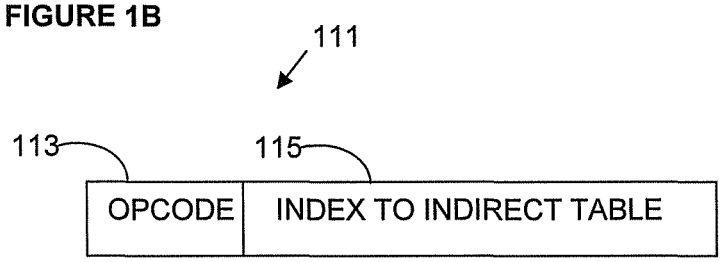
FIG. 1B is a schematic diagram of a computer or microprocessor instruction according to an embodiment of the present invention.
Figure 1C:
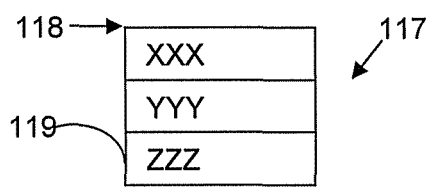
FIG. 1C is a schematic diagram of an indirect table under operand indirect according to an embodiment of the present invention.

"Operand indirect" is a form of operand addressing available in instruction sets. Under the implementation of operand indirect of the present invention, an instruction includes an opcode and indexes to operand information located in indirect tables (instead of actual operands). Under operand indirect, there is an indirect table for each operand field used in the instruction set. For example, an instruction set with a single operand field has one indirect table; instruction sets with two operand fields will have two indirect tables. Any number of indirect tables may be used according to the number of operand fields in the instruction set. Upon being loaded by a computer or processor, each indirect table is associated with an indirect table base, which changes when the indirect table is moved to a different location in memory. The indirect table base is a memory location or address of the start of the indirect table. For example, FIG. 1B illustrates an individual instruction 111 having an opcode 113 and an index to an indirect table 115. FIG. 1C illustrates an indirect table 117 having an indirect table base 118 and, as shown, three entries, including individual entry 119.

Operand indirect is one of the enforcement mechanisms utilized by the embodiments of the present invention. According to an embodiment of the present invention, operand indirect is to be used on each instruction in all instruction sets of a protected piece of software code. The operand indirect embodiments of the present invention particularly enable software code execution security with respect to snooping of the code to find vulnerabilities or other similar forms of tampering because any analysis of the code without the indirect tables is practically meaningless. Instead of the operands, all that is available within the executable code segment are indexes, or pointers or references, to tables of operands. As understood by those skilled in the art, either preprocessing the source code before compilation or post-processing the compiled code can ensure that operand indirect is used on each instruction of all instruction sets.

Enforcing the indirect access by all operands can have an execution time cost, but not a significant cost according to embodiments of the present invention. Since the normalized distance to data will remain the same, the data access will occur from on-chip cache if it would have done so under normal circumstances, as understood by those skilled in the art. Off chip memory latency will generally remain the same. Accordingly, since modern processors spend a significant portion of their time waiting on action at the chip/memory bus interface, this feature should not significantly change a program's execution time, as understood by those skilled in the art.

In modern computer and microcontroller architectures, one of the hardware or microarchitecture mechanisms is the implementation of a program counter. The program counter, also known as the instruction address register, is responsible for maintaining the address of the next sequential instruction, or NSI, to be executed. Operations of the program counter produce the effective fetch address, or EFA. Each instruction is fetched for the processor to handle based on the contents of the EFA. Typically, after an instruction is fetched, the program counter is automatically incremented by "one" to form the EFA of the NSI. Branch instructions, however, are different. If an unconditional branch instruction is executed, the operand is treated as a value and is simply added to the program counter (or replaces it, depending on the compiler used) to form the EFA prior to the next instruction fetch. If a conditional branch instruction is executed, the operand value is only added to or replaces the program counter if the condition evaluates to "true." If the condition evaluates to "false," the program counter is automatically incremented by "one." Here "one" is understood to mean "one instruction length." Any indirect non-sequence-of-control instruction, as well as any conditional or unconditional branch indirect, operates in this typical manner with the following exception, included for completeness: the instruction operand is treated as the "address of the operand value" rather than as that of the value itself, such as in a "jumpvia: register" instruction, as understood by those skilled in the art.

Figure 2:
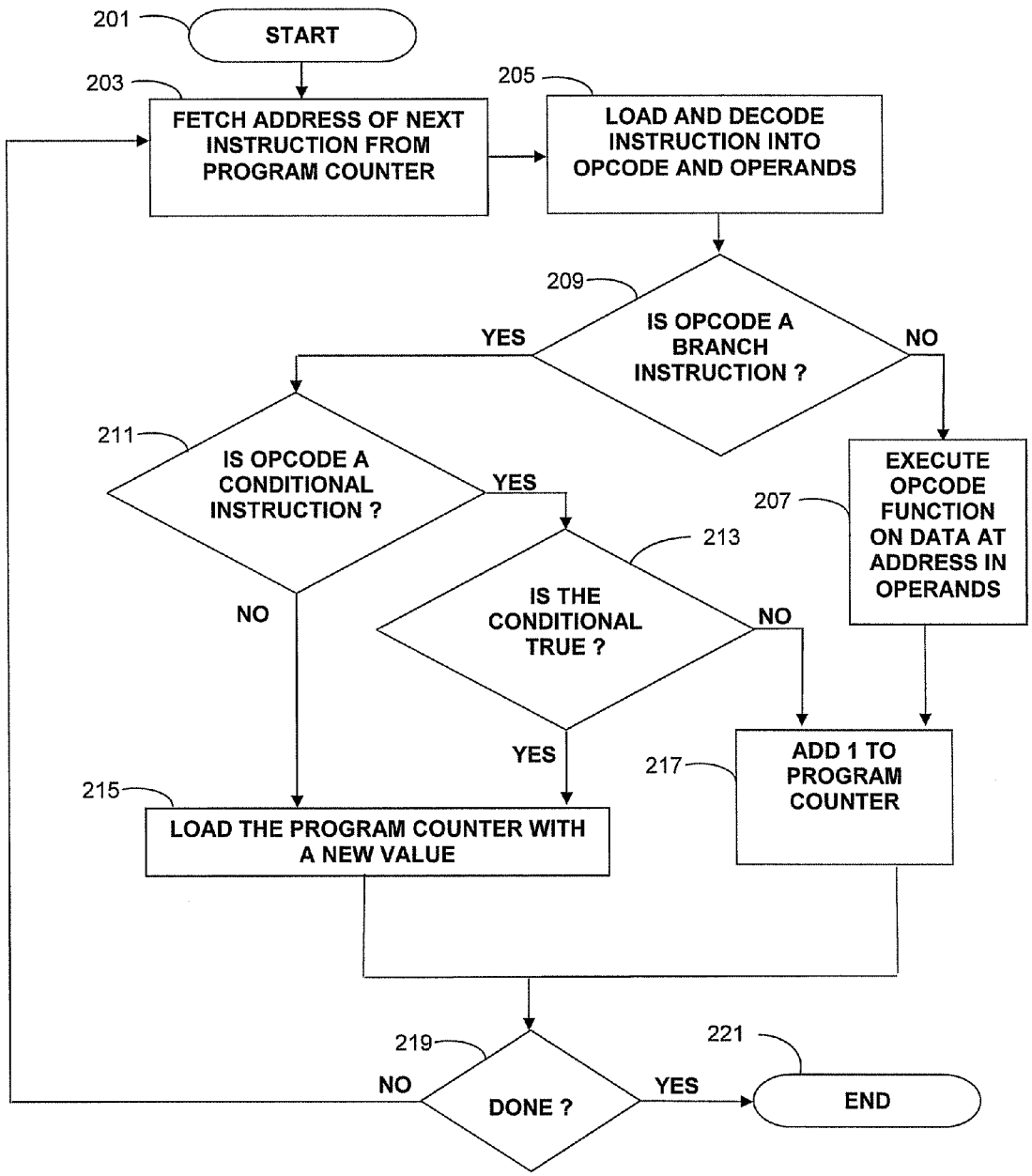
FIG. 2 is a logic diagram of typical code execution according to prior art.

FIG. 2 illustrates a logic diagram of typical code execution according to prior art beginning at 201. The fetch address of the next instruction is obtained from the program counter shown at 203. Then the instruction is loaded and decoded into opcode and operands shown at 205. Next a determination is made whether the opcode is a branch instruction shown at 209. If the opcode is not a branch instruction, then the opcode function is executed on the data at the address in the operands shown at 207. Then the program counter is incremented; that is, "one" is added to the program counter shown at 217. If the opcode is a branch instruction, a determination is made whether the opcode is a conditional instruction shown at 211. If the opcode is a conditional instruction, a determination is made whether the condition is true shown at 213. If the condition is not true, then the program counter is incremented shown at 217. If the condition is true, or if the opcode is not a conditional instruction, then program counter is loaded with a new value using the operand(s) shown at 215. Next a determination is made whether the program is done, or whether there are more instructions shown at 219. If the program is done, that is the end shown at 221. If the program is not done, then cycle repeats and the fetch address of the next instruction is obtained from the program counter shown at 203.

Figure 7:
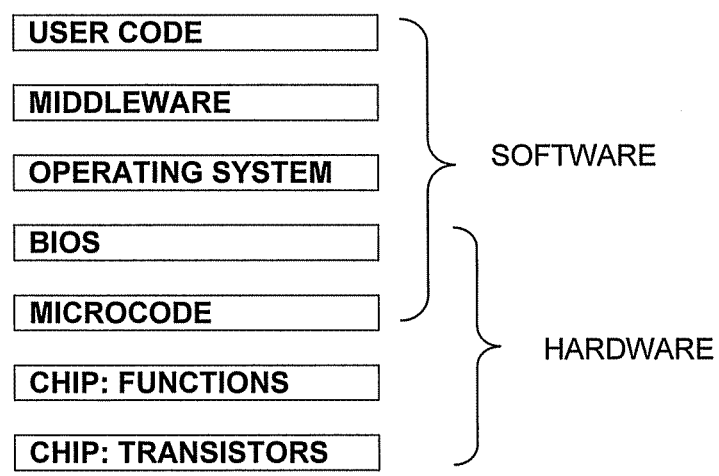
FIG. 7 is a block diagram illustrating an abstraction of code execution on a chip according to an embodiment of the present invention.

In contrast, embodiments of the present invention utilize a jump table and implement a non-typical instruction fetch as an individual instruction level ("atomic level") enforcement mechanism for secure code execution. This mechanism may be implemented in microcode or hardware. See, e.g., FIG. 7. The jump table provides a sequentially stored vector table and contains information necessary to retrieve the next sequential instruction ("NSI"). As with an operand indirect table, the jump table is associated with a jump table base upon being loaded by a computer or processor, and the jump table base can advantageously change when the jump table is moved to a different location in memory. The jump table base is the memory location or address of the start of the jump table. Similarly, upon being loaded by a computer or processor, the executable code segment is associated with a code segment base, and the code segment base can advantageously change when the code segment is moved to a different location in memory. The code segment base is the memory location or address of the start of the code segment. Embodiments of the present invention advantageously include the jump table and indirect tables that can be relocated in memory at static or dynamic offsets from the code segment base address to thereby further impede an attack.

According to an embodiment of the present invention, the program counter (instruction address register) can contain the address of the NSI to be executed, or EFA, and each instruction can be fetched based upon the contents of the program counter. After any instruction is fetched, however, the code segment base plus the value at the jump table entry is loaded into the program counter to form the EFA of the NSI. There is generally no difference in the way that a non-sequence-of-control or a branch instruction is handled to obtain the EFA of the NSI, except when a conditional branch evaluates to "true." A conditional branch instruction evaluating to "true" can have two different ways of completing the EFA before the next fetch. If operand indirect has not been implemented, then there is no indirect table, and the program counter is loaded with the code segment base plus the offset value in the operand. This is not, however, recommended according to an embodiment of the present invention. According to an embodiment of the present invention, if operand indirect has been implemented, then there is an indirect table containing operand information, and the indirect table entry is used to complete the EFA of the NSI.

FIG. 3 illustrates a logic diagram of secure code execution according to an embodiment of the present invention beginning at 301. The fetch address of the next instruction is obtained from the program counter shown at 303. Then the instruction is loaded and decoded into opcode and an index to an indirect table shown at 305. Next a determination is made whether the opcode is a branch instruction shown at 308. If the opcode is not a branch instruction, then the opcode function is executed on data at the operand address obtained through indirect table shown at 307 and then the program counter is loaded with the code segment base plus the jump table entry value shown at 317. If the opcode is a branch instruction, then a determination is made whether the branch instruction is a conditional and the condition evaluates to "true" shown at 309. If the conditional does not evaluate to "true" or the branch instruction is not a conditional, then the program counter is loaded with the code segment base plus the jump table entry value shown at 317. If the branch code is a conditional and the condition evaluates to "true," then a determination is made whether branch instruction operand indirect is implemented shown at 311. If branch instruction operand indirect is not implemented, then the program counter is loaded with the code segment base plus the offset value in the operand itself shown at 315. If branch instruction operand indirect is implemented, then the program counter is loaded with a new value using the indirect table shown at 313. Next a determination is made whether the program is done, or whether there are more instructions shown at 319. If the program is done, that is the end shown at 321. If the program is not done, then cycle repeats and the fetch address of the next instruction is obtained from the program counter shown at 303. For illustration purposes only, one operand field and one indirect table have been discussed, but the embodiments of the present invention are not to be limited to instructions with a single operand field or only one type of microarchitecture as understood by those skilled in the art. In other embodiments, relative addressing to the current instruction can be used instead of relative addressing to the code, jump, and indirect tables bases, as understood by those skilled in the art.

It will be understood by those skilled in the art that for branch instructions, executing the instruction and loading the program counter can often be thought of as a single step under embodiments of the present invention because executing a branch instruction involves determining the NSI. As embodiments of the present invention provide the NSI through a jump table, the serial steps of executing the (branch) instruction and loading the program counter from the jump table can have the same effect of loading the program counter from the jump table as understood by those skilled in the art. Alternately, as embodiments of the present invention provide operand data through an indirect table, the serial steps of executing the (branch) instruction using data from the indirect table and loading the program counter merge when the execution of the (branch) instruction involves loading data from the indirect table into the program counter.

A jump table according to embodiments of the present invention can be easily implemented in hardware or microcode (see, e.g., FIG. 7) through the program instruction counter and would be expected to only add "one" cycle time to the normal next sequential instruction fetch during execution. The jump table can be stored on-chip within the volatile memory, or elsewhere, making even the code located in non-volatile memory undecodable in the event of a loss of power or other unexpected (or preplanned) event. Beneficially, the use of the jump table allows the scrambling, or encoding, of the executable code. The scrambling algorithm may be limited to an instruction cache block, or constrained to a level 1 or level 2 instruction cache block in a multi-level cache as understood by those skilled in the art, to minimize losses of execution speed due to memory access latency during instruction time. Further beneficially, taking into account the number of average instructions before a branch, the worst case scenario under this constraint would be similar to the normal loss experienced as a result of the subroutine branches in typical "C" code as understood by those skilled in the art.

Figure 8:
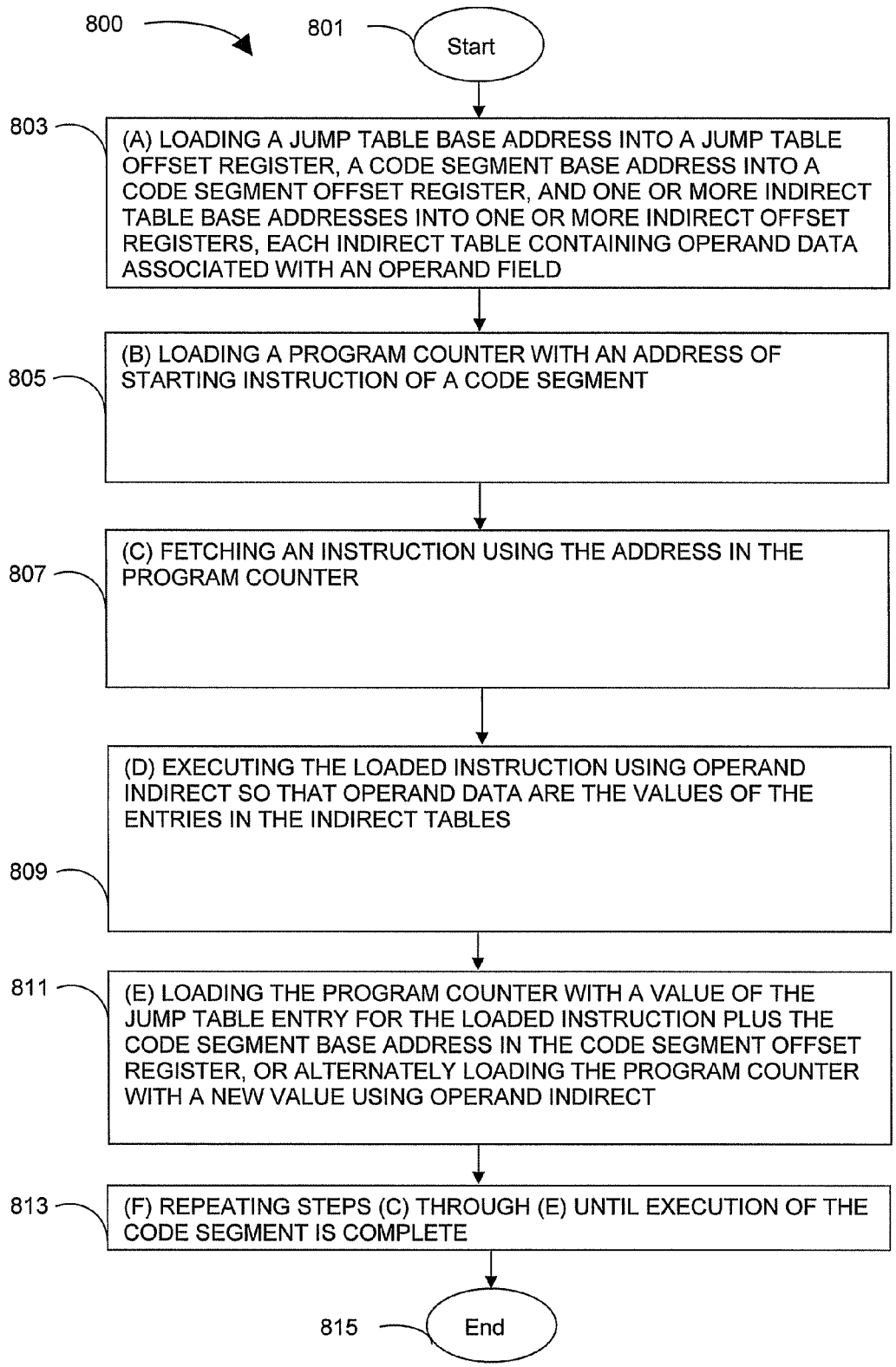
FIG. 8 is a block flow diagram of a method of secure code execution according to an embodiment of the present invention.

Embodiments of the present invention can include a method of secure code execution. For example, as illustrated in FIG. 8, according to an embodiment of the present invention, such a method shown at 800 can include loading a jump table base address into a jump table offset register, a code segment base address into a code segment offset register, and one or more indirect table base addresses into one or more indirect offset registers shown at 803. Each indirect table contains operand data associated with an operand field. The method also includes loading a program counter with an address of a starting instruction of a code segment shown at 805. The method further includes the following steps and repeating these steps until execution of the code segment is complete shown at 813: fetching an instruction using the address in the program counter shown at 807; executing the loaded instruction using operand indirect so that operand data are the values of the entries in the indirect tables shown at 809; and loading the program counter with a value of the jump table entry for the loaded instruction plus the code segment base address in the code segment offset register, or alternately loading the program counter with a new value using operand indirect shown at 811.

According to an embodiment of the present invention, a method of secure code execution can include, for example, loading a program counter with an address of a starting instruction of a code segment. The method also includes the following steps: loading one or more indirect table base addresses into one or more indirect offset registers, each indirect table containing operand data associated with an operand field; loading a jump table base address into a jump table offset register; and loading a code segment base address into a code segment offset register. The method also includes the following steps and repeating these steps until execution of the code segment is complete: fetching an instruction using the address in the program counter; decoding the fetched instruction into an opcode and one or more indexes to the one or more indirect tables, each index associated with a single operand field and a single indirect table; adding the indirect table base address in the indirect offset register to the index to the indirect table for each index to the one or more indirect tables to thereby determine one or more run-time operands; executing the opcode using the one or more run-time operands; and loading the program counter with an addition of the code segment base address in the code segment offset register to a value of the jump table entry or indirect table entry associated with the instruction.

Figure 9A:
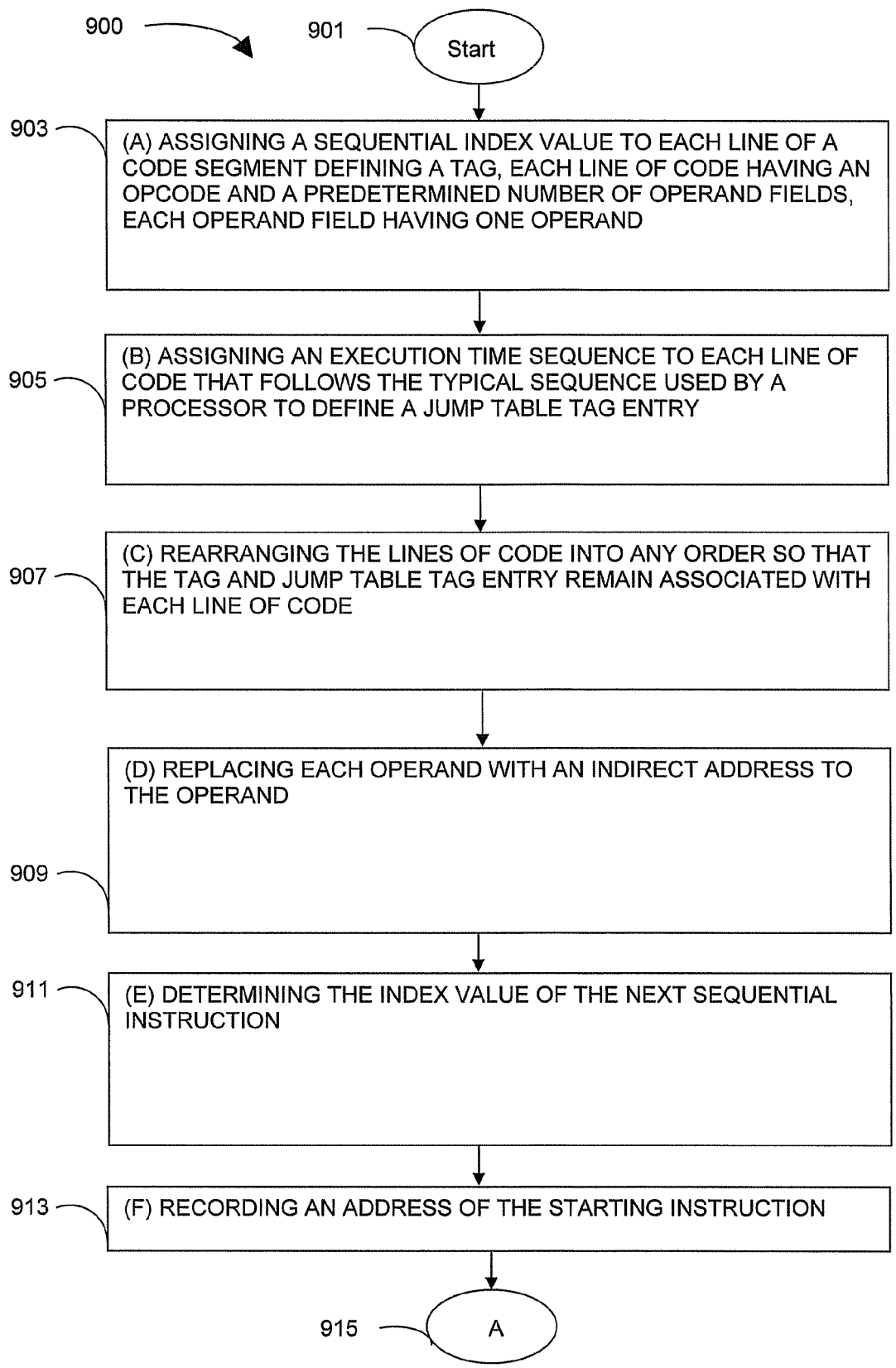
FIGS. 9A-9B are a block flow diagram of a method of providing tamper-resistant executable software code according to an embodiment of the present invention.
Figure 9B:
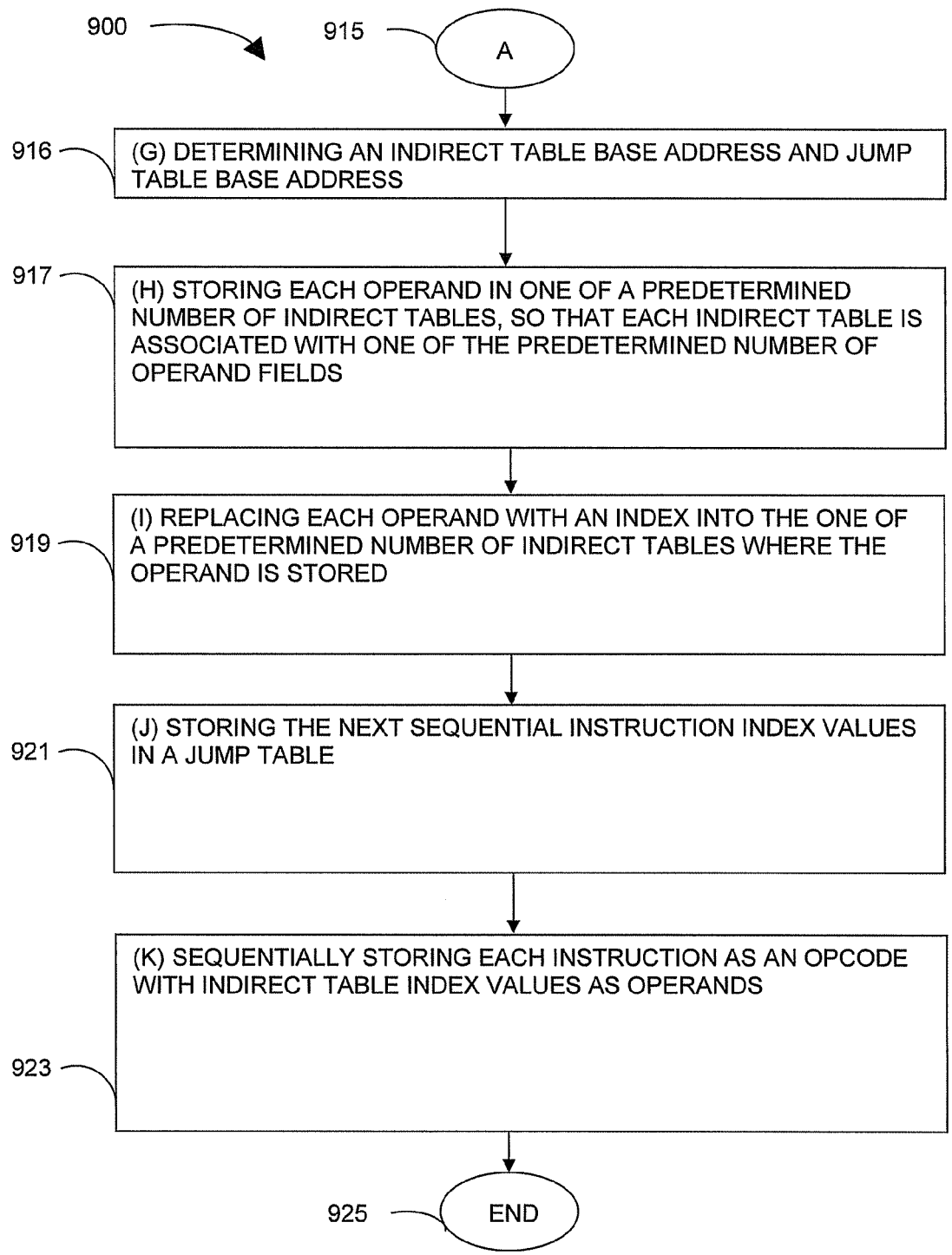

Embodiments of the present invention further include a method of providing tamper-resistant executable software code. For example, as perhaps best illustrated in FIGS. 9A and 9B, according to an embodiment of the present invention, such a method of providing tamper-resistant executable software code shown at 900, can include assigning a sequential index value (defining a tag) to each line of a code segment shown at 903. Each line of code has an opcode and a predetermined number of operand fields, and each operand field has one operand. The method also includes assigning an execution time sequence (jump table tag entry) to each line of code that follows the typical sequence used by a processor shown at 905 and rearranging the lines of code into any order so that the tag and jump table tag entry remain associated with each line of code shown at 907. The method includes replacing each operand with an indirect address to the operand shown at 909 and determining the index value of the next sequential instruction shown at 911. The method includes recording an address of the starting instruction shown at 913 and determining an indirect table base address and jump table base address 916. The method further includes storing each operand in one of a predetermined number of an indirect tables, so that each indirect table is associated with one of the predetermined number of operand fields shown at 917; replacing each operand with an index into the one of a predetermined number of indirect tables where the operand is stored shown at 919; storing the next sequential instruction index values in a jump table shown at 921; and sequentially storing each instruction as an opcode with indirect table index values as operands shown at 923.

As illustrated in FIG. 10, according to an embodiment of the present invention, a computer-implemented method of providing tamper-resistant executable software code shown at 1000 can include preparing, e.g., formatting, all instructions in a code segment to use operand indirect addressing by a computer associated with securing the code segment defining a security computer so that each instruction comprises an opcode and indirect table index values shown at 1003 and storing, by the security computer, operand data in one or more index tables associated with the code segment shown at 1005. The computer-implemented method also includes encoding the code segment by rearranging its instructions by the security computer so that the code segment is converted into tamper-resistant executable software code shown at 1007 and sequentially storing next sequential instruction index values in a jump table so that the encoded code segment can be decoded during execution through use of the jump table shown at 1009. The method includes the jump table and indirect tables being relocated in memory at will. Advantageously, the indirect table and jump table embodiments of the present invention can be implemented independently or, preferably, together as understood by those skilled in the art.

Figures 4D, 4E, 4F, 4G, 4H:
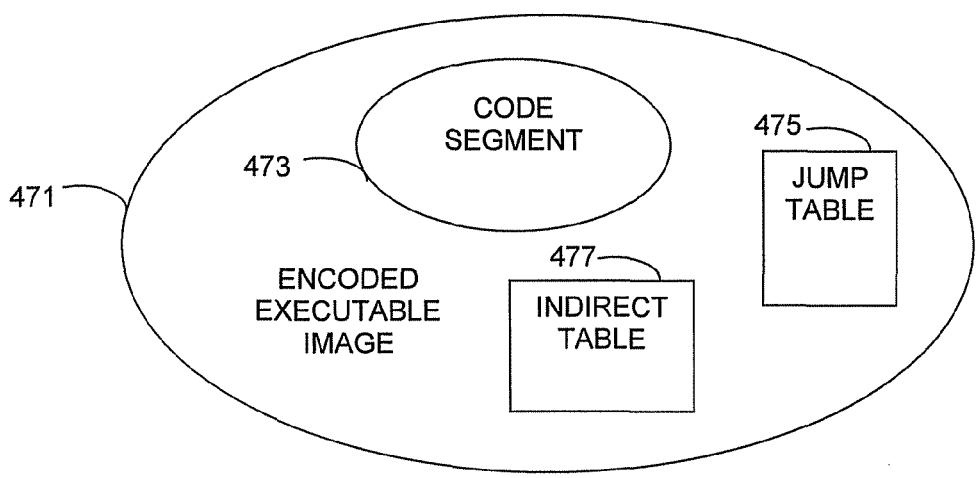

An example of an encoding scheme for providing tamper-resistant executable software is given in FIGS. 4A-4G using a single operand instruction set for simplicity. Embodiments of the present invention, however, can be applied to any number of operands. FIG. 4A illustrates for the example a set of instructions where each line of code has been assigned a sequential index value to each line of a code segment defining a tag in column 401. Each line of code has an opcode in column 403 and a single operand in column 405. For illustration purposes, the value of the opcodes are represented by symbols, in which L denotes "load", A denotes "add", T denotes "store", J denotes "jump", JN denotes "jump on negative", S denotes "subtract", and H denotes "halt" or program code segment complete. Each line of code in FIG. 4A has been assigned an execution time sequence that follows the typical sequence used by a processor to define a jump table tag entry in column 407. That is, column 407 contains the tag of the next sequential instruction. Thus, the first row has a tag value of 1; an opcode value of L, which denotes "load"; an operand of A; and a tag value for the NSI of 2. The fifth row has a tag value of 5; an opcode value J, which denotes "jump"; an operand of 8; and a tag value for the NSI of 8. The tag value of 5 corresponds to the assignment of the line of code in sequence; i.e., this is the fifth line of code. Tags are symbols and do not have to be numeric, as understood by those skilled in the art. The tag value for the NSI of 8 is because executing this opcode results in a jump to the line of code that corresponds to tag 8. The fourth row has a tag value of 4; an opcode value of JN, which denotes "jump on negative"; an operand of 6, and a tag value for the NSI of 5. This instruction is a conditional. If the condition is negative, executing this opcode results in a jump to the line of code that corresponds to the tag 6 via the operand data. If the condition is not negative, executing this opcode results in executing the line of code in sequence; thus, the tag value for the NSI is 5.

FIG. 4B illustrates for the example a rearrangement of the lines of code with the tag and jump table tag entry remaining associated with each line of code. Each line of code includes a tag in column 411, an opcode in column 413, an operand in column 415, and a tag for the NSI in column 417. In this example, the odd and even rows are swapped so that contents of row 2 is now in row 1, and the contents of row 1 is now in row 2. The odd-even swap illustrated is but one embodiment of the encoding scheme according to embodiments of the present invention; numerous other rearrangement or encoding schemes are included in the various embodiments of the present invention as understood by those skilled in the art. Also, it is to be noted that dead space is allowed as illustrated in FIG. 4B.

FIG. 4C illustrates for the example replacing each operand with an indirect address to the operand in column 425. Each line of code also includes a tag in column 421, an opcode in column 423, and a tag for the NSI in column 427. The parentheses around the operand in column 425 indicate an indirectly addressed operand. Thus, the address B is being turned into the indirectly addressed operand (B). Because of the rearrangement of the rows, the operand whose direct address is tag 6 is being turned into an indirectly addressed operand of (5). Likewise, the operand whose direct addresses are tags 8, 2, and 3 are being turned into indirectly addressed operands of (7), (1), and (4), respectively. FIG. 4C also illustrates the determination of the index value of the NSI in column 429. For example, a tag value for the NSI of 3 in column 427 corresponds to the index value of 4 in column 429, reflecting the rearrangement of the lines of code.

FIG. 4D illustrates for the example the process of storing each operand in an indirect table in column 437 and replacing each operand with an index into the indirect tables where the operand is stored in column 435. For illustration purposes, the index value i1 indicates an index into the first entry in the indirect table. Each line of code also includes an index in column 431, an opcode in column 433, and an index value for the NSI in column 439.

FIG. 4E illustrates for the example sequential storage of each instruction as an opcode in column 441 with indirect table index values as operands in column 443. FIG. 4F illustrates for the example an indirect table in column 451. FIG. 4G illustrates, for the example, a jump table in column 461 with each entry storing the next sequential instruction index value. FIG. 4H illustrates an encoded executable image 471 having various components, including a code segment 473, a jump table 475, and an indirect table 477, according to an embodiment of the present invention.

Figures 5A, 5B, 5C, 5D, 5E, 5F, 6:
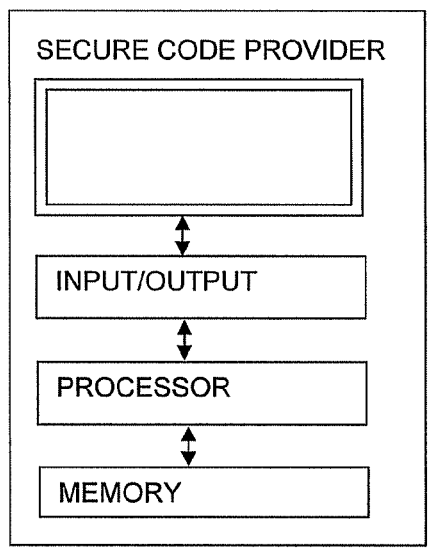
FIGS. 5A-5C are a series of tables illustrating an example of a failed attempt to exploit a code segment using a "jump out, execute malicious code, and jump back" attack according to an embodiment of the present invention.
FIGS. 5D-5F are a series of tables illustrating an example of a failed attempt to exploit a code segment using an "inline code overlay" attack according to an embodiment of the present invention.
FIG. 6 is a block diagram of a system according to an embodiment of the present invention.

FIGS. 5A-5C expound on the example discussed in FIGS. 4A-4G with an example of an attempt to exploit the segment using a "jump out, execute malicious code, and jump back" attack as understood by those skilled in the art. FIG. 5B contains the indirect table in column 505, and FIG. 5C contains the jump table in column 507. The code segment in FIG. 5A has been tampered with to now include a "jump out" command 509 as understood by those skilled in the art. Rather than jump to location 20, under embodiments of the present invention, this "jump out" command will be interpreted as a jump indirect. Without access to the jump table, the malicious code cannot be reached or executed in sequence. Access to the indirect table would also not assist this attack. Note that if the hardware policy enforces a trap of an attempt to execute non-instruction or recognizes attempts to access outside the currently "in operation" jump table range as understood by those skilled in the art, then a secure fail, a safe fail, or a tamper attempt notification may be effected, as understood by those skilled in the art.

FIGS. 5D-5F expound on the example discussed in FIGS. 4A-4G with another example an attempt to exploit the segment using an "inline code overlay" attack as understood by those skilled in the art. FIG. 5E contains the indirect table in column 555, and FIG. 5F contains the jump table in column 557. The code segment in FIG. 5D has been tampered with to now include an "inline code overlay" attack entered in rows 561, 563, 565, 567, 569. Execution of the malicious code can be prevented because operands are interpreted as indirects, and all executable instructions proceed via the jump table. It is possible that the attacker could find some way to replace individual opcodes on instructions, but without knowledge of the jump table and indirect table, as understood by those skilled in the art, the effect of individual opcode changes cannot be controlled by the attacker.

Figure 11:
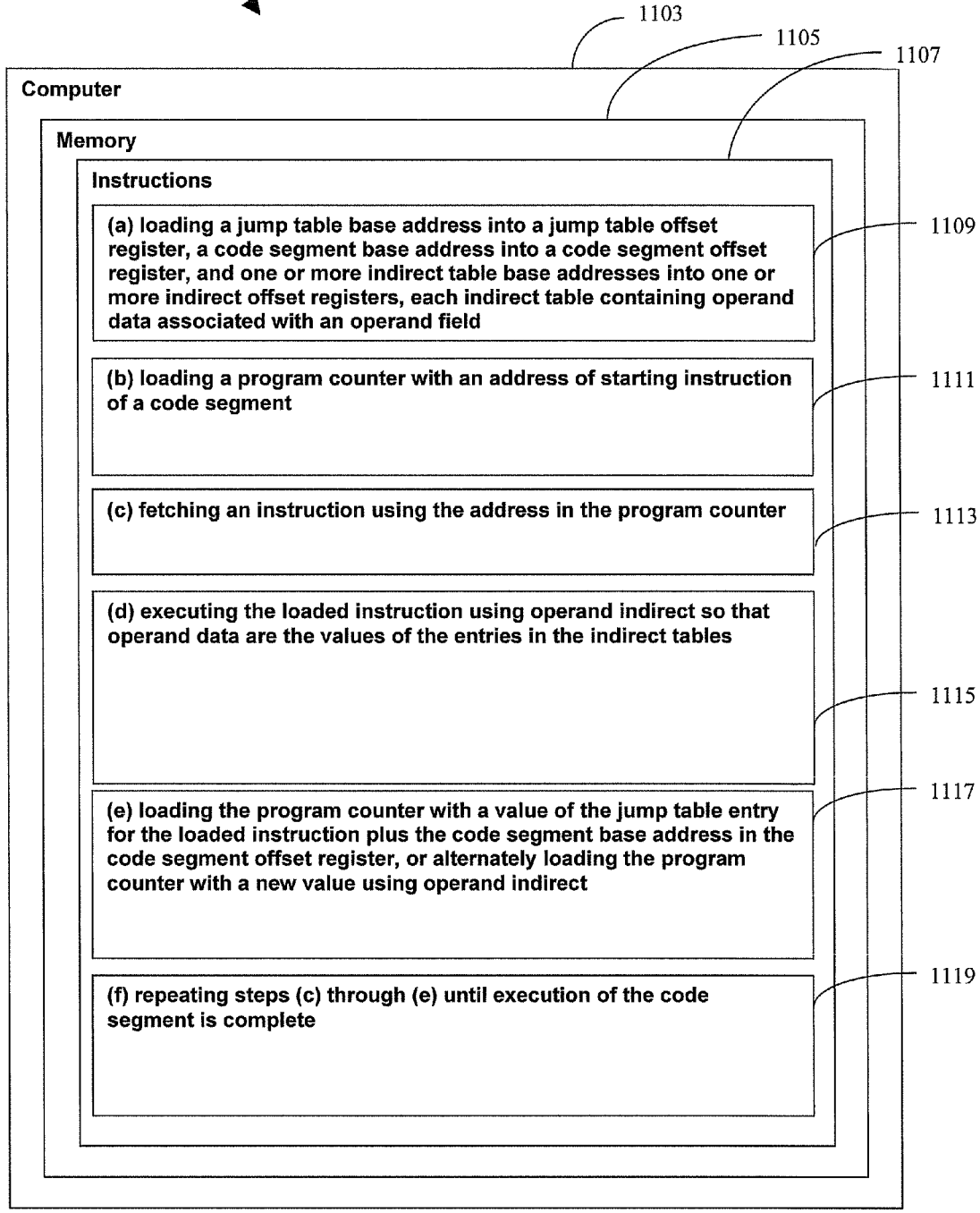
FIG. 11 is a schematic block diagram of a program product according to an embodiment of the present invention.

As perhaps best shown in FIG. 11, an embodiment of the present invention includes a program product 1101 stored in one or more tangible computer readable media (e.g., memory 1105) and readable by a computer 1103. The program product 1101 can operate, for example, to perform the following instructions shown at 1107 that when read by the computer 1103, caused the computer to perform the operation of: loading a jump table base address into a jump table offset register, a code segment base address into a code segment offset register, and one or more indirect table base addresses into one or more indirect offset registers shown at 1109. Each indirect table contains operand data associated with an operand field. The instructions also include those to perform the operation of loading a program counter with an address of starting instruction of a code segment shown at 1111. The instructions further include those to perform the following operations and repeating these instructions until execution of the code segment is complete shown at 1119. The instructions include fetching an instruction using the address in the program counter shown at 1113; executing the loaded instruction using operand indirect so that operand data correspond to values of the entries in the indirect tables shown at 1115; and loading the program counter with a value of the jump table entry for the loaded instruction plus the code segment base address in the code segment offset register, or alternately loading the program counter with a new value using operand indirect shown at 1117. Note, the program product 1101 can be in the form of microcode, programs, routines, and symbolic languages that provide a specific set for sets of ordered operations that control the functioning of the hardware and direct its operation, as known and understood by those skilled in the art.

As perhaps best illustrated in FIG. 6, embodiments of the present invention provide for, for example, a system 600 for providing tamper-resistant executable software code. The system 600 includes an input/output unit 601 for transferring commands to the computer from an operator; a processor 603 for responding to commands from the processor; a memory 605 having stored therein a computer program product, such as, for example, program product 1207 (FIG. 12), operable on the processor, the computer program product comprising a set of instructions that, when executed by the processor, cause the computer to provide tamper-resistant executable software code by performing the operations discussed below and illustrated in FIG. 12.

Figure 12:
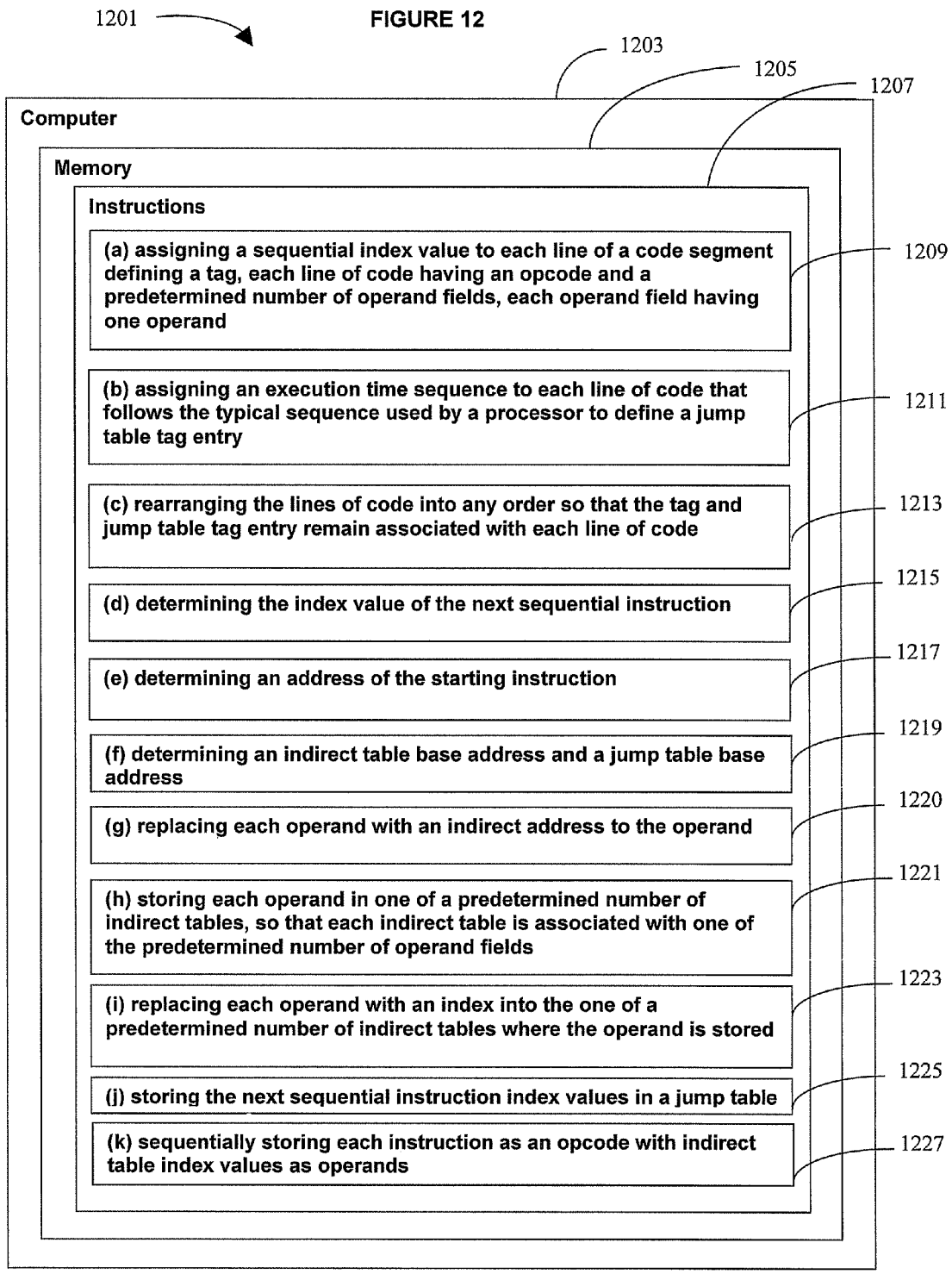
FIG. 12 is a schematic block diagram of a program product according to an embodiment of the present invention.

As perhaps best illustrated in FIG. 12, another embodiment of the present invention, program product 1201 stored in one or more tangible computer readable media 1205 and readable by a computer 1203, for example, is provided. The program product 1201 includes a set of instructions 1207 that, when read or executed by a processor of computer 1203, can operate to cause the computer 1203 to perform the following operations: assigning a sequential index value to each line of a code segment defining a tag 1209. Each line of code has an opcode and a predetermined number of operand fields, and each operand field has one operand. The operations can also include assigning an execution time sequence to each line of code that follows the typical sequence used by a processor to define a jump table tag entry 1211 and rearranging the lines of code into any order so that the tag and jump table tag entry remain associated with each line of code 1213. The operations include determining the index value of the next sequential instruction 1215 and determining an address of the starting instruction 1217. The operations include determining an indirect table base address and jump table base address 1219 and replacing each operand with an indirect address to the operand 1220. The operations also include storing each operand in one of a predetermined number of an indirect tables, so that each indirect table is associated with one of the predetermined number of operand fields 1221; replacing each operand with an index into the one of a predetermined number of indirect tables where the operand is stored 1223; storing the next sequential instruction index values in a jump table 1225; and sequentially storing each instruction as an opcode with indirect table index values as operands 1227.

Figure 13:
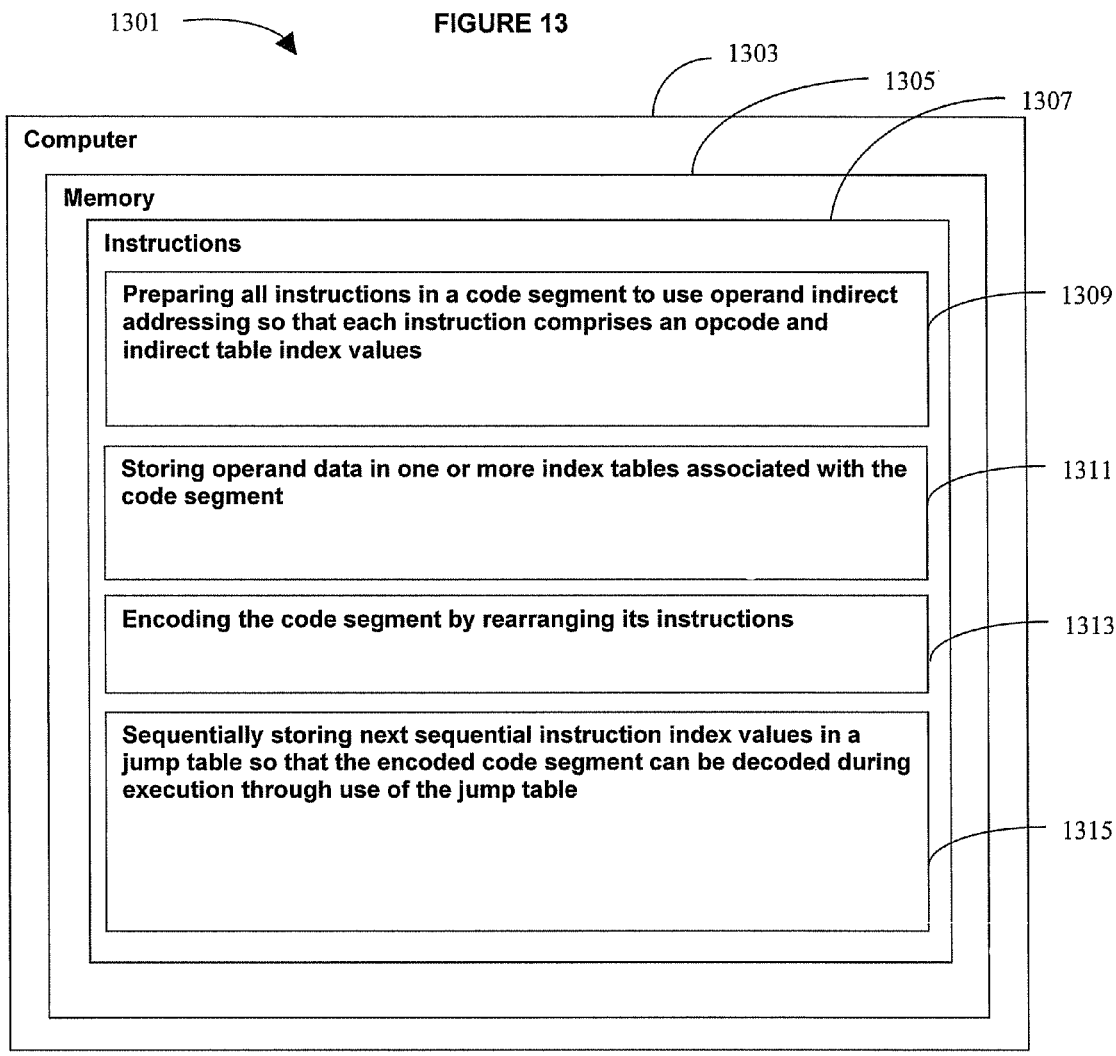
FIG. 13 is a schematic block diagram of a computer server having program product stored in memory thereof according to an embodiment of the present invention.

As perhaps best shown in FIG. 13, in yet another embodiment of the present invention, program product 1301 stored in one or more tangible computer readable media 1305 and readable by a computer 1303, for example, is provided. The program product 1301 includes a set of instructions 1307 that, when read or executed by a processor of computer 1303, can cause the computer 1303 to operate to perform the following operations: preparing, e.g., formatting, all instructions in a code segment to use operand indirect addressing so that each instruction comprises an opcode and indirect table index values 1309 and storing operand data in one or more indirect tables associated with the code segment 1311. The instructions also include encoding the code segment by rearranging its instructions 1313 and sequentially storing next sequential instruction index values in a jump table so that the encoded code segment can be decoded during execution through use of the jump table 1315.

It is important to note that while embodiments of the present invention have been described in the context of a fully functional system, those skilled in the art will appreciate that the mechanism of at least portions of the present invention and/or aspects thereof are capable of being distributed in the form of a computer readable medium of instructions in a variety of forms for execution on a processor, processors, or the like, and that embodiments of the present invention apply equally regardless of the particular type of signal bearing media used to actually carry out the distribution. Examples of computer readable media include but are not limited to: nonvolatile, hard-coded type media such as read only memories (ROMs), CD-ROMs, and DVD-ROMs, or erasable, electrically programmable read only memories (EEPROMs), recordable type media such as floppy disks, hard disk drives, CD-R/RWs, DVD-RAMs, DVD-R/RWs, DVD+R/RWs, flash drives, and other newer types of memories, and transmission type media such as digital and analog communication links. For example, such media can include both operating instructions and operations instructions related to the various program product and the method steps, described above.

The embodiments of the present invention have numerous advantages, including the advantages of traditional encryption/decryption without the execution speed penalty. The embodiments of the present invention lock the software code preventing execution or meaningful disclosure without the jump table and indirect tables, whose locations can be changed at will. The embodiments of the present invention are also relatively cheap and add to and strengthen existing solutions. Moreover, the embodiments of the present invention can be combined with field-programmable gate arrays, or FPGAs, and other hardware designs for high speed execution, dynamic encoding at load time and decoding during execution.

This application claims priority to and the benefit of U.S. Provisional Patent Application Ser. No. 61/075,522, by Safford, titled "Systems, Methods, and Program Products for Secure Code Execution", filed Jun. 25, 2008, incorporated herein by reference in its entirety.

It is to be understood that the invention is not limited to the exact details of construction, operation, exact materials, or embodiments shown and described, as modifications and equivalents will be apparent to one skilled in the art. In the drawings and specification, there have been disclosed illustrative embodiments of the invention and, although specific terms are employed, they are used in a generic and descriptive sense only and not for the purpose of limitation. Accordingly, the invention is therefore to be limited only by the scope of the appended claims.

That claimed is:

1. A computer system for providing tamper-resistant executable software code, comprising:
    an input/output unit for transferring commands to a computer from an operator;
    a processor for responding to commands from the operator;
    a memory comprising non-transitory computer memory media having stored therein a computer program, the computer program comprising a set of instructions that, when executed by the processor, cause the computer to provide tamper-resistant executable software code by performing the operations of:
        encoding a code segment being protected by rearranging its instructions in contiguous memory,
        formatting each instruction of an instruction set contained within the code segment being protected to use operand indirect addressing, each instruction comprising an opcode and one or more index values to a corresponding one or more tables of indirect address entries, one index value for each operand position or field of one or more operand positions or fields in each instruction in the instruction set, each table of the one or more tables of indirect address entries containing a plurality of indirect addresses of a corresponding plurality of operands in one of the one or more operand positions or fields for a corresponding plurality of instructions of the instruction set,
        storing each table of indirect address entries associated with the code segment in memory, and
        storing a plurality of next sequential instruction index values in a jump table, the jump table configured to be utilized to decode the encoded code segment during execution, the jump table being located in noncontiguous memory with respect to the rearranged instructions, the plurality of next sequential instruction index values comprising a corresponding plurality of offset values organized within the jump table to correspond with an organization of the rearranged instructions so that when a present instruction is not a branch instruction, or is a branch conditional instruction and its condition is false, and when referenced and added to a code segment base value, the respective offset value corresponding to the present instruction provides a program counter a memory location of the respective next sequential instruction.

2. A system of claim 1, wherein execution of the encoded code segment of the executable software code includes a non-typical instruction fetch associated with the program counter whereby:
    when the present instruction is a branch conditional instruction and its condition is false or is not a branch instruction, a fetch address provided by the program counter comprises a code segment base plus the respective offset value of the plurality of offset values within the jump table, and
    when the present instruction is a branch conditional instruction and the condition is true, the fetch address provided by the program counter comprises a value obtained using a value retrieved using a corresponding one of the tables of indirect address entries.

3. A system of claim 1, wherein the operation of encoding the code segment by rearranging its instructions in contiguous memory comprises scrambling instructions within a cache block to thereby minimize losses due to memory access latency during execution, and wherein the operations further comprise relocating the jump table and the one or more tables of indirect address entries in memory at static offsets from a code segment base address during execution, the code segment base address being the memory location of a start of the code segment.

4. A system of claim 1, wherein the operation of encoding the code segment by rearranging its instructions in contiguous memory comprises scrambling instructions within a cache block to thereby minimize losses due to memory access latency during execution, and wherein the operations further comprise relocating jump table and the one or more tables of indirect address entries in memory at dynamic offsets from a code segment base address during execution, the code segment base address being the memory location of a start of the code segment.

5. A system of claim 1, wherein the operation of formatting each instruction of the instruction set contained within the code segment to use operand indirect addressing further comprises preprocessing source code before compilation, and wherein the operation of formatting each instruction to use operand indirect addressing includes formatting each instruction to use multiple-level operand indirect addressing, the addressed operands comprising a register or memory location.

6. A system of claim 1, wherein the operation of formatting each instruction of the instruction set contained within the code segment to use operand indirect addressing further comprises post-processing code after compilation, and wherein the operation of formatting each instruction to use operand indirect addressing includes formatting each instruction to use multiple-level operand indirect addressing, the addressed operands comprising a register or memory location.

7. A program product comprising instructions defining program code stored in one or more non-transitory computer readable media and readable by a computer so that the program code operates to cause the computer to perform the following operations when executed by the computer:
encoding a code segment by rearranging its instructions in contiguous memory;
formatting each instruction of an instruction set contained within the code segment to use operand indirect addressing, each instruction comprises an opcode and one or more index values to a corresponding one or more tables of indirect address entries, one index value for each operand position or field of one or more operand positions or fields in each instruction in the instruction set, each table of indirect address entries containing a plurality of indirect addresses of a corresponding plurality of operands in one of the one or more operand positions or fields for a corresponding plurality of instructions of the instruction set;
storing each table of indirect address entries associated with the code segment in memory; and
storing a plurality next sequential instruction index values in a jump table, the jump table configured to be utilized to decode the encoded code segment during execution through use of the jump table, the jump table being located in noncontiguous memory with respect to the rearranged instructions, the plurality of next sequential instruction index values comprising a corresponding plurality of offset values organized within the jump table to correspond with an organization of the rearranged instructions so that when a present instruction is not a branch instruction, or is a branch conditional instruction and its condition is false, and when referenced and added to a code segment base value, the respective offset value corresponding to the present instruction provides a program counter a memory location of the respective next sequential instruction.

8. A program product of claim 7, wherein execution of the encoded code segment of the executable software code includes a non-typical instruction fetch associated with the program counter whereby:
when the present instruction is a branch conditional instruction and its condition is false or is not a branch instruction, a fetch address provided by the program counter comprises a code segment base plus the respective offset value of the plurality of offset values within the jump table, and
when the present instruction is a branch conditional instruction and the condition is true, the fetch address provided by the program counter comprises a value obtained using a value retrieved using a corresponding one of the tables of indirect address entries.

9. A program product of claim 7, wherein operations further comprise relocating the jump table and the one or more tables of indirect address entries in memory at static offsets from a code segment base address during execution, the code segment base address being the memory location of a start of the code segment.

10. A program product of claim 7, wherein operations further comprise relocating the jump table and the one or more tables of indirect address entries in memory at dynamic offsets from a code segment base address during execution, the code segment base address being the memory location of a start of the code segment.

11. A program product of claim 7, wherein the operation of formatting each instruction of the instruction set contained within the code segment to use operand indirect addressing further comprises preprocessing source code before compilation, and wherein the operation of formatting each instruction to use operand indirect addressing includes formatting each instruction to use multiple-level operand indirect addressing, the addressed operands comprising a register or memory location.

12. A program product of claim 7, wherein the operation of formatting each instruction of the instruction set contained within the code segment to use operand indirect addressing further comprises post-processing code after compilation, and wherein the operation of formatting each instruction to use operand indirect addressing includes formatting each instruction to use multiple-level operand indirect addressing, the addressed operands comprising a register or memory location.

13. A program product of claim 7, wherein the operation of encoding the code segment by rearranging its instructions in contiguous memory comprises scrambling instructions within a cache block to thereby minimize losses due to memory access latency during execution.

14. A computer-implemented method of providing tamper-resistant executable software code, comprising the steps of:
encoding a code segment by rearranging its instructions in contiguous memory by a computer associated with securing the code segment defining a security computer;
formatting each instruction of an instruction set contained within the code segment to use operand indirect addressing by the security computer so that each instruction comprises an opcode and one or more index values to a corresponding one or more tables of indirect address entries so that the code segment is converted into tamper-resistant executable software code, one index value for each operand position or field of one or more operand positions or fields in each instruction in the instruction set, each table of indirect address entries containing a plurality of indirect addresses of a corresponding plurality of operands in one of the one or more operand positions or fields for a corresponding plurality of instructions of the instruction set;

storing each table of indirect address entries associated with the code segment in memory by the security computer;

storing a plurality of next sequential instruction index values in a jump table by the security computer, the jump table configured to be utilized to decode the encoded code segment during execution through use of the jump table, the jump table being located in noncontiguous memory with respect to the rearranged instructions, the plurality of next sequential instruction index values comprising a corresponding plurality of offset values organized within the jump table to correspond with an organization of the rearranged instructions so that when a present instruction is not branch instruction, or is a branch conditional instruction and its condition is false, and when referenced and added to a code segment base value, the respective offset value corresponding to the present instruction provides a program counter a memory location of the respective next sequential instruction.

15. A computer-implemented method of claim 14, wherein execution of the encoded code segment of the executable software code includes the non-typical instruction fetch associated with a program counter, whereby:

when the present instruction is a branch conditional instruction and its condition is false or is not a branch instruction, a fetch address provided by the program counter comprises a code segment base plus the respective offset value of the plurality of offset values within the jump table, and when the present instruction is a branch conditional instruction and the condition is true, the fetch address provided by the program counter comprises a value obtained using a value retrieved using a corresponding one of the tables of indirect address entries.

16. A computer-implemented method of claim 14, further comprising the step of relocating the jump table and the one or more tables of indirect address entries in memory at static offsets from a code segment base address during execution, the code segment base address being the memory location of a start of the code segment.

17. A computer-implemented method of claim 14, further comprising the step of relocating the jump table and the one or more tables of indirect address entries in memory at dynamic offsets from a code segment base address during execution, the code segment base address being the memory location of a start of the code segment.

18. A computer-implemented method of claim 14, wherein the step of formatting each instruction of the instruction set contained within the code segment to use operand indirect addressing further comprises preprocessing source code before compilation, and wherein the operation of formatting each instruction to use operand indirect addressing includes formatting each instruction to use multiple-level operand indirect addressing, the addressed operands comprising a register or memory location.

19. A computer-implemented method of claim 14, wherein the step of formatting each instruction of the instruction set contained within the code segment to use operand indirect addressing further comprises post-processing code after compilation, and wherein the operation of formatting each instruction to use operand indirect addressing includes formatting each instruction to use multiple-level operand indirect addressing, the addressed operands comprising a register or memory location.

20. A computer-implemented method of claim 14, wherein the step of encoding the code segment by rearranging its instructions in contiguous memory comprises scrambling instructions within a cache block to thereby minimize losses due to memory access latency during execution.

* * * * *